(12) United States Patent
Spiro

(10) Patent No.: US 8,402,435 B1
(45) Date of Patent: Mar. 19, 2013

(54) SYSTEMS AND METHODS FOR ORGANIZING SOURCE CODE

(75) Inventor: Jono Spiro, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1259 days.

(21) Appl. No.: 11/952,266

(22) Filed: Dec. 7, 2007

(51) Int. Cl.
G06F 9/44 (2006.01)

(52) U.S. Cl. ......................................... 717/120
(58) Field of Classification Search .................. None
See application file for complete search history.

(56) References Cited

U.S. PATENT DOCUMENTS

| | | | | |
|---|---|---|---|---|
| 5,854,932 A | * | 12/1998 | Mariani et al. | 717/116 |
| 5,923,880 A | * | 7/1999 | Rose et al. | 717/145 |
| 2002/0046400 A1 | * | 4/2002 | Burch | 717/154 |
| 2004/0143823 A1 | * | 7/2004 | Wei | 717/140 |
| 2004/0172625 A1 | * | 9/2004 | Shinn et al. | 717/140 |
| 2008/0104096 A1 | * | 5/2008 | Doval et al. | 707/101 |
| 2008/0184225 A1 | * | 7/2008 | Fitzgerald et al. | 718/1 |

OTHER PUBLICATIONS

"HAXE web oriented universal language." web page at http://haxe.org/ref, as available via the internet and printed Dec. 6, 2007.

* cited by examiner

Primary Examiner — Wei Zhen
Assistant Examiner — Adam R Banes
(74) Attorney, Agent, or Firm — Kilpatrick Townsend & Stockton LLP

(57) ABSTRACT

Methods for organization of compiled and uncompiled source code are disclosed. In one embodiment, the method includes separating source code into a plurality of subroutines. The method also includes determining a relationship between a first subroutine and a second subroutine of the plurality of subroutines. The method further includes creating a first signature of the first subroutine. The method also includes creating a second signature of the second subroutine. The method further includes storing the first signature and the second signature so as to preserve the relationship between the first subroutine and the second subroutine.

27 Claims, 12 Drawing Sheets

SYSTEMS AND METHODS FOR ORGANIZING SOURCE CODE

FIELD OF THE INVENTION

Embodiments of the invention relate generally to the field of data processing systems. More particularly, embodiments of the invention relate to systems and methods for organizing source code signatures.

BACKGROUND

In the creation of a program, source code is developed by a programmer or group of programmers. The source code is then compiled in order to create an executable. To determine modifications to be made to the source code, the developer(s) typically execute the executable under test conditions and identify sections of the program for modification. The developers then identify the portion of source code responsible for the identified sections and modify those portions of source code.

In order to retest, developer(s) typically recompile all portions of the source code and repeat testing of the executable. The process of modifying and recompiling source code and testing the executable may be reiterated many times. Recompilation is time and resource intensive. Therefore, some developers may want a compiler to reduce the amount of source code to recompile. To do so, the system may save compiled portions of the source code. If a modification is made to the source code, the system knows all portions related to the modified portion of source code and recompiles all of the related portions. For example, a project including a modified first class file may define all other class files related to the modified first class file. Thus, all class files in the project are recompiled no matter what modification is made to the first class file, including simply adding a comment to the first class file.

One problem is that many portions of source code are unnecessarily identified for recompilation.

SUMMARY

In one embodiment, the method includes separating source code into a plurality of subroutines. The method also includes determining a relationship between a first subroutine and a second subroutine of the plurality of subroutines. The method further includes creating a first signature of the first subroutine. The method also includes creating a second signature of the second subroutine. The method further includes storing the first signature and the second signature so as to preserve the relationship between the first subroutine and the second subroutine.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF PREFERRED EMBODIMENTS

Figure 1:
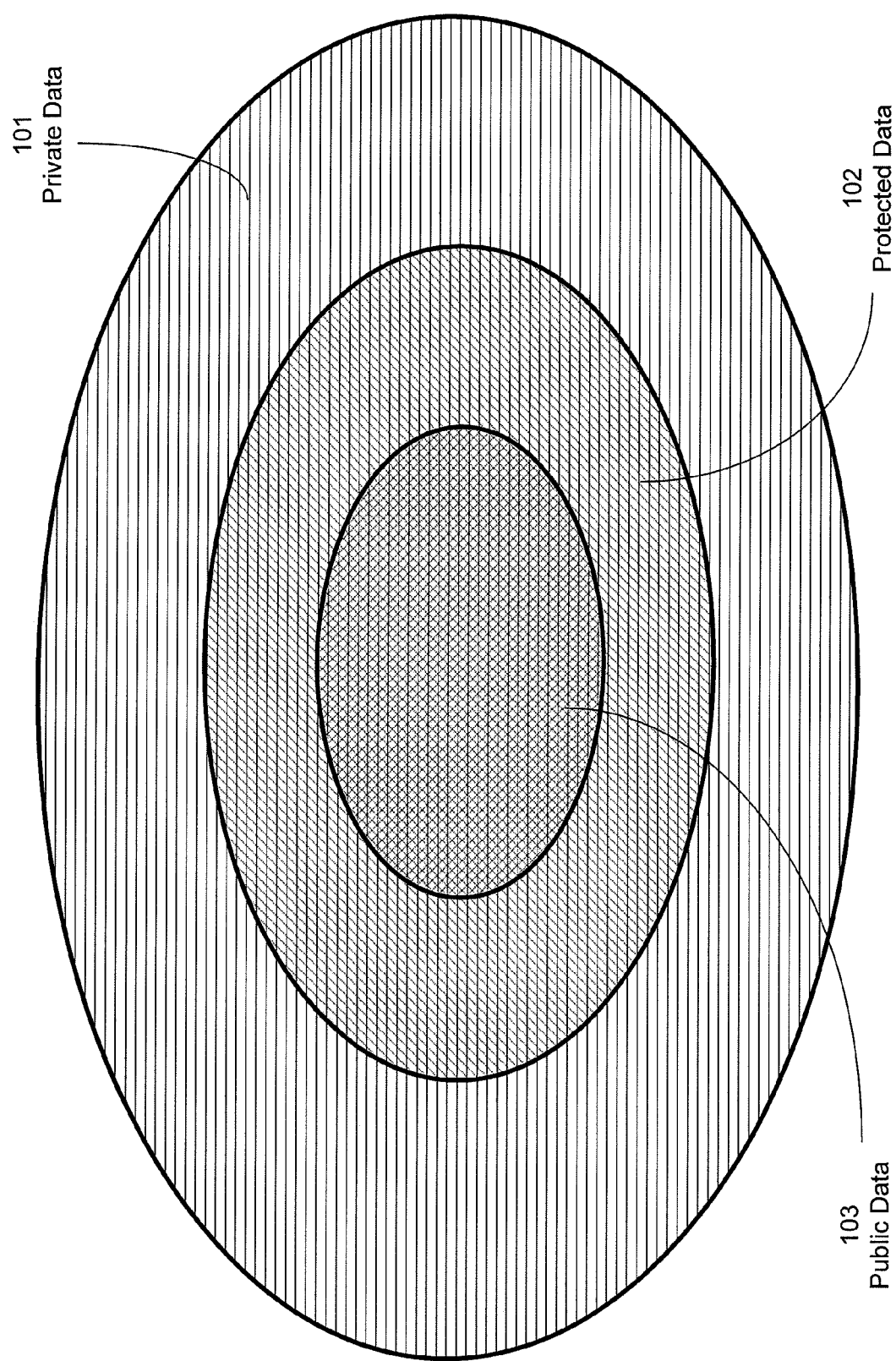
FIG. 1 illustrates an example Venn Diagram of private, public, and protected data of an example subroutine.

Embodiments of the invention relate generally to the field of data processing systems. More particularly, embodiments of the invention relate to systems and methods for organizing source code signatures. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

One embodiment of the present invention reduces the amount of resources to recompile source code by reducing the amount of source code to be recompiled. To do so, in one embodiment, the system: stores previously compiled source code to be reused; organizes the source code in order to recognize which portions of source code need to be recompiled; and replaces portions of existing compiled source code with the portions of source code that are recompiled.

In one embodiment of organizing the source code, the system separates the source code into subroutines to be organized. The system then determines what portions of each subroutine affect which other subroutines. In order to determine when modifications to data of a first subroutine affecting other subroutines have been made, the system may generate signatures for each subroutine, wherein generation of a specific signature of a subroutine may exclude different portions of the subroutine. In order to create a plurality of signatures, the system may determine a plurality of concentric portions of data of each subroutine. The data of the concentric portions affect less and less of the other subroutines when approaching a central data of the portions. Signatures may be created from the different portions of data (e.g., private, protected, and public).

In one embodiment, the different types of signatures (e.g., private data signatures, public data signatures, and protected data signatures) are grouped and organized by subroutine dependency to allow a system to quickly recognize which subroutines are affected if a public or protected data signature is found to be different. For example, the system may group a first protected data signature with other protected data signatures whose subroutines are affected by the protected data of the first subroutine of the first protected data signature. The same type of organization may also be made for public data signatures. Hence, the system may include an index of organized protected data signatures and an index of organized public data signatures for quick lookup of which subroutines are to be recompiled.

Below is described an example system regarding FIGS. 2-4 for creating and organizing signatures and comparing signatures to determine subroutines for recompilation.

Illustrative System for Creating, Organizing, and Managing Signatures

Figure 2:
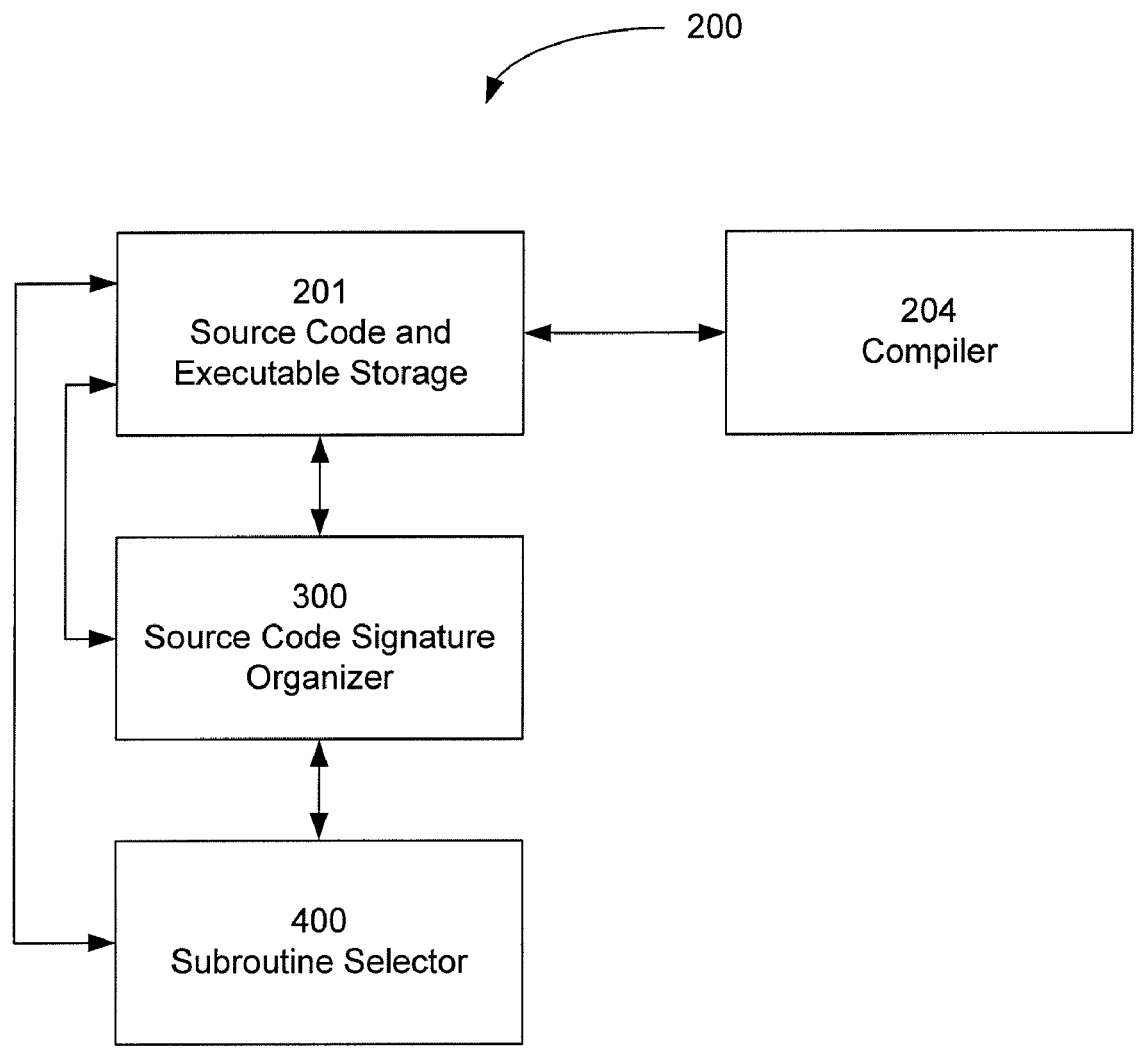
FIG. 2 shows an illustrative system for organizing signatures of subroutines of the source code.

FIG. 2 illustrates one embodiment of a system 200 for creating and organizing signatures and subroutines of source code in order to manage relationships between the subroutines for recompilation. In one embodiment, subroutines are a generic building block of source code and may be in any form or size. A subroutine may include, but is not limited to, a project, class, method, file, object or any portion or combination of the above. As previously stated, the subroutines may be organized into private, public, or protected data. In one embodiment, the public, protected, and private data may be concentric portions of a subroutine. For example, referring to FIG. 1, private data 101 includes protected data 102 and public data 103, and protected data 102 includes public data 103. In another embodiment, public, protected, and private data may not fit concentrically within one another. Therefore, protected data may not be part of private data and public data may not be part of private or protected data. Hence, while the portions of data may have some relation, the portions do not perfectly ovelap (e.g., public data 103 does not fit concentrically in private data 101). Therefore, the compiler may account for different variations in grouping portions of subroutines and account for such variations during compilation. No matter whether the public, protected, and private data portions may or may not overlap, in one embodiment, all of the identified portions of data for all of the subroutines covers all of the data of the project. Hence, no data lies outside of the public, private, and protected data of all of the subroutines.

Referring to signatures, in one embodiment, a signature is an identifier of a subroutine or a portion of a subroutine. In one embodiment, creation of a signature is a hash of the subroutine code. In another embodiment, creation of a signature is a hash of an identifier of a subroutine, such as an API signature. In another embodiment, the signature may be created in any way which uniquely identifies whether defined portions of a subroutine have been amended and reduces the size of the index from storing the full subroutines. The signature may further be, but is not limited to, the original text, a portion of the original text, a hash value of the text, a hash value of a portion of the text, or a hash value of byte code.

In one embodiment, a dependency is a relationship between subroutines. For example, if subroutine A is dependent from subroutine B, then data of subroutine A is related to data of subroutine B. Dependencies may be defined with any granularity such that not all relationships between subroutines are included in dependency information. Referring to data, in one embodiment, data may be any information of a project. For example, data may include, but is not limited to, fields, low-level dependency information, variables of a class, metadata, namespaces, etc. To describe the comity of dependency and data, in one example, when one subroutine calls another subroutine, the caller subroutine is dependent on the callee subroutine. In the example, the data may be the information to call the subroutine. In one embodiment, relationships between information are dependencies between the information.

Referring back to FIG. 2, the system 200 generally includes a source code and executable storage 201 for storing the source code written by the developers and the executable(s) (compiled subroutines 203). The storage 201 is connected to compiler 204 for compiling source code to be stored as compiled subroutines 203 of storage 201. The storage 201 is also connected to the source code signature organizer 300, which determines from the source code relationships between the subroutines of the source code 202, creates different signatures (e.g., private, protected, and public) from portions of each subroutine, and organizes the signatures to preserve the relationships between the subroutines. The storage 201 and source code signature organizer 300 are both connected to a subroutine selector 400, which determines which subroutines may be affected by a modification to a first subroutine and thus may select those subroutines for recompilation.

Source Code Organizer

Figure 3:
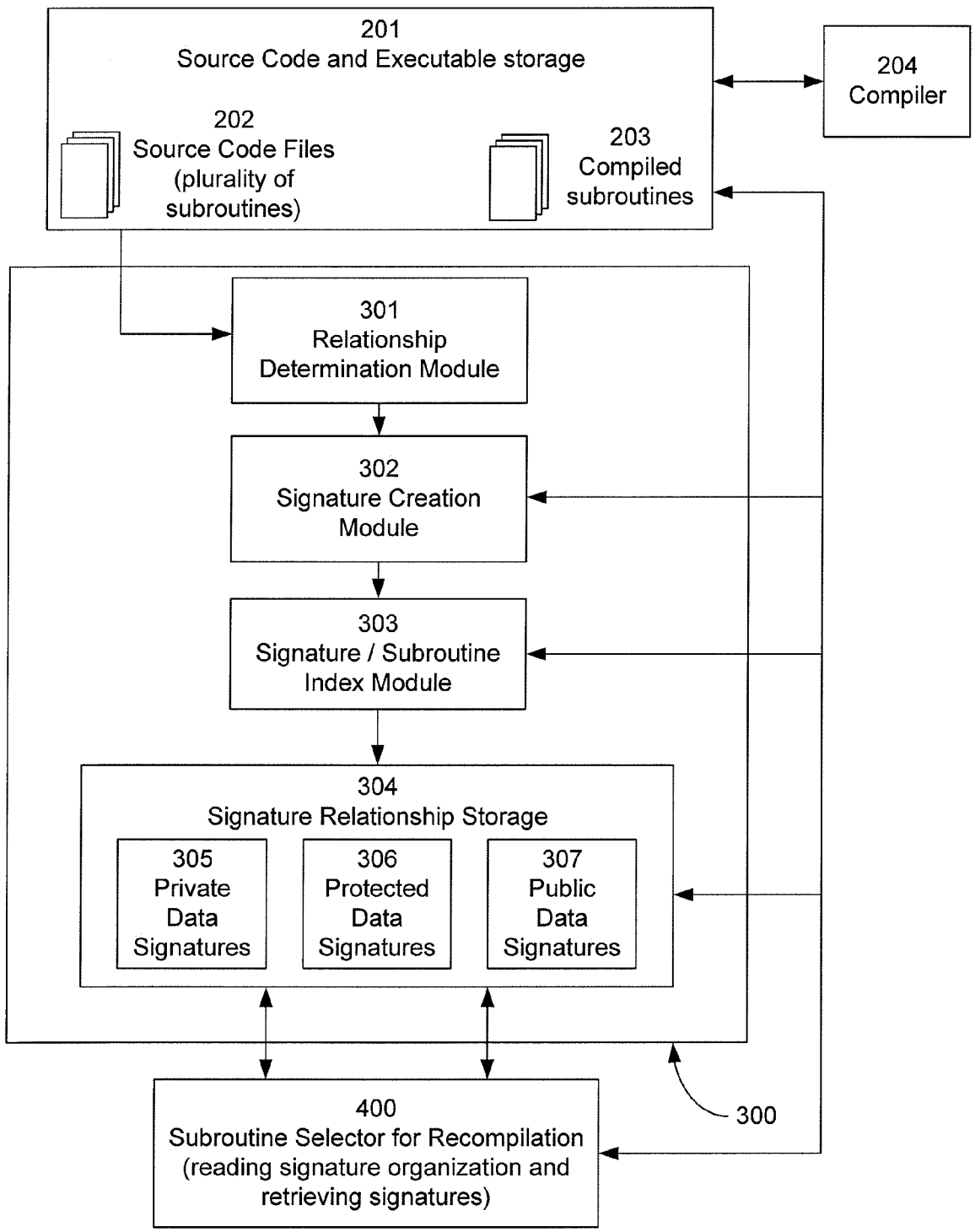
FIG. 3 illustrates an embodiment of the source code signature organizer of FIG. 2 for organizing relationships of a plurality of subroutines of source code and creating a plurality of signatures depending on defined portions of data in a subroutine for each subroutine.

FIG. 3 illustrates an example source code signature organizer 300 of system 200 in FIG. 2. The source code signature organizer 300 may include a relationship determination module 301 for determining which subroutines are affected by specific data of a subroutine (e.g., which subroutines may be affected by protected data of a first subroutine). The organizer 300 may further include a signature creation module 302 for creation of public, protected, and private data signatures for each subroutine. The organizer may additionally include a signature/subroutine index module 303 for determining which subroutine a signature identifies and a signature relationship storage 304 for organizing private data signatures 305, protected data signatures 306, and public data signatures 307 according to the relationships determined by the relationship determination module 301. The index module 303 may further allow the subroutine selector 400 to identify from signatures which subroutines are to be recompiled by compiler 204.

Therefore, in one embodiment, the module 303 may include an index of the signatures in mapping to specific subroutines. Thus, when the system is determining which subroutines to recompile, the index may be used to determine from a collected group of signatures which subroutines are to be recompiled. In another embodiment, a signature may be deconstructed in order to determine a subroutine or the subroutine may have the signature stored with it as an identifier. In addition, in one embodiment, the signature relationship storage 304 may store multiple versions of at least some of the signatures of the subroutines. For example, if a subroutine may have been modified and new private, protected, and public data signatures are created for the subroutine, storage 304 may store the old signatures for the subroutine before supposed modification and the new signatures for the subroutine after the supposed modification. In another embodiment, the module 304 persistently stores a signature of a subroutine until a new signature is stored for the subroutine.

Subroutine Selector for Recompilation

Figure 4:
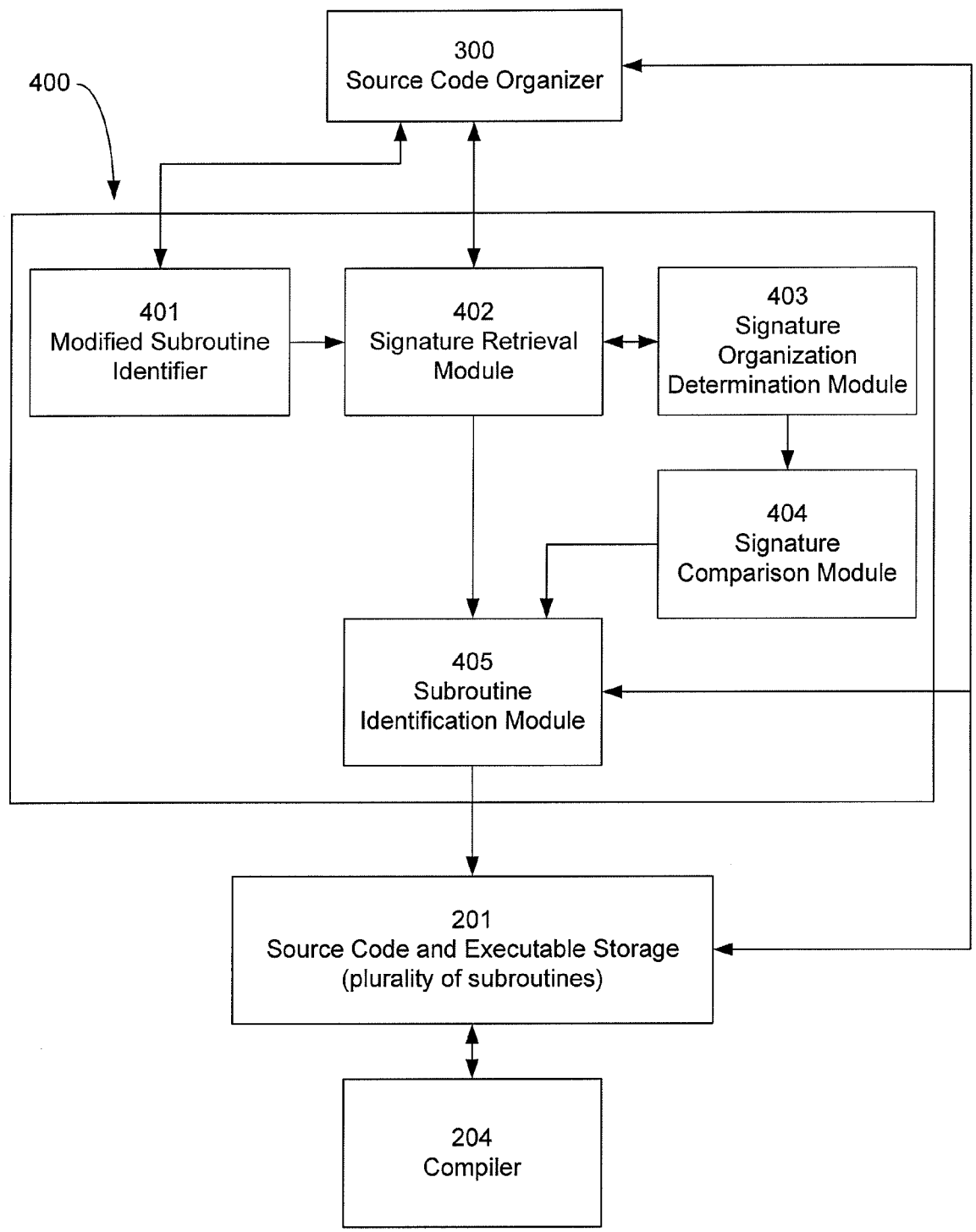
FIG. 4 illustrates an embodiment of the subroutine selector of FIG. 2 for determining which subroutines of source code are to be recompiled during recompilation of the source code.

FIG. 4 illustrates an example subroutine selector 400 for selecting subroutines that may be affected by modified portions of source code 202. In one embodiment, the selector 400 generally comprises a modified subroutine identifier 401 for finding newer signatures stored in storage 304 in FIG. 3. A newer signature may identify a modified subroutine. In one embodiment, the identifier 401 compares timestamps of signatures to determine if any of the signatures are newer than others.

The selector 400 may also include a signature retrieval module 402 for retrieving signatures of any subroutine that may be related to the subroutine from the new signature and signatures of the possibly modified subroutine. In one embodiment, the signature retrieval module 402 receives the signatures of subroutines related to a subroutine in a format so as to preserve information about the relationships between the subroutines. For example, if the signatures are organized in a tree structure with a signature of a first subroutine being the trunk and the related subroutines' signatures being branches, the signature retrieval module may receive the signatures in the tree branch form so as to preserve the subroutine relationship information.

The selector 400 may further comprise a signature organization determination module 403 for organizing the multiple new and old signatures of a subroutine that may have been modified and organizing the signatures of other subroutines that may be affected by the possibly modified subroutine. In one embodiment, the signature organization module 303 also manages the signatures to be retrieved by the retrieval module 402. The selector 400 may also include a signature comparison module 404 to compare old and new signatures of a possibly modified subroutine identified by identifier 401 to determine if the subroutine is actually modified and what type of data of the subroutine (e.g., private, protected, public) has been modified.

For example, the signature comparison module 404 may compare a new public data signature to an old public data signature to determine if public data of the subroutine has been modified, compare a new protected data signature to an old protected data signature to determine if protected data has been modified (if the public data signatures match), and compare a new private data signature to an old private data signature to determine if private data has been modified (if the public data signatures and the protected data signatures match).

The selector 400 may further include a subroutine identification module 405 for receiving new signatures that do not match old signatures (e.g., public, protected, and/or private) for a modified subroutine; receiving organized signatures of subroutines related to the modified subroutine; and determining which subroutines are affected by the modification by comparing which type of new signature does not match (e.g., public, protected, and/or private) for a modified subroutine and thus determining what type of data was modified (e.g., public, protected, or private) in the modified subroutine. To further determine the affected subroutines, module 305 may further identify signatures of the same type (e.g., public, private, or protected) of subroutines depicted as affected by the modified signature and then determine the subroutines from the identified signatures. For example, for a modified protected data signature of a modified subroutine as the base signature, the branch protected data signatures are identified and the signature/subroutine index in module 303 of organizer 300 is queried to determine which subroutines affect the identified protected data signatures and thus are to be recompiled. The determination may then be sent to storage 201 for recompilation of the identified subroutines.

The illustrative system FIGS. 2-4 are an example system for performing the methods illustrated in FIGS. 5-8 and 10-11 and are described in greater detail below. For the following methods, the groups of signatures and different types of data in a subroutine are discussed as being public, protected, and private, but any delineation or granularity of types of data may be performed, including only two types of data (e.g., private and public), or four or more types of data.

Creation and Organization of Signatures

Figure 5:
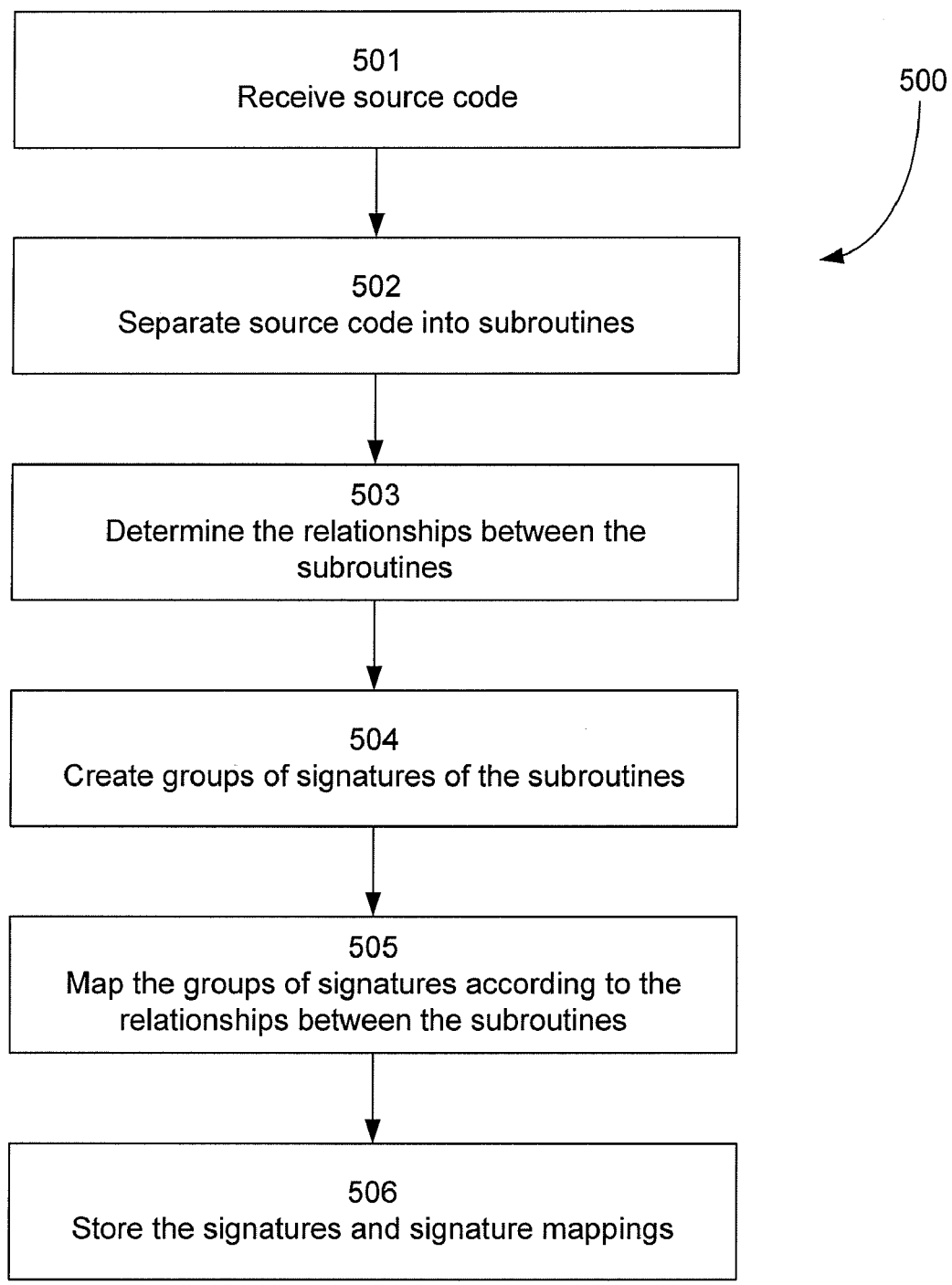
FIG. 5 illustrates an exemplary method for the organizer of FIG. 3 to organize subroutines of source code and signatures of the subroutines.

FIG. 5 illustrates an example method 500 for creating and organizing groups of signatures by organizer 300 so as to preserve identified relationships between subroutines of the source code 202. Beginning at 501, the relationship determination module 301 receives the source code 202 from storage 201. Proceeding to 502, the relationship determination module 301 separates the source code 202 into subroutines. In one embodiment, the source code 202 is separated according to files. Hence, a file of the source code 202 is considered one subroutine. In another embodiment, the source code 202 may be broken down into methods or processes.

Upon separating the source code 202 into subroutines, the relationship determination module 301 determines the relationships between the subroutines in 503. For example, module 301 determines which subroutines are related to the protected data of a first subroutine. In one embodiment, the relationships help determine which subroutines are to be recompiled. For example, a value modifiable in a first subroutine may be accessible by ten other subroutines. Therefore, if code in the first subroutine relating to the value is changed and the first subroutine recompiled, the compiler may determine to recompile the other ten subroutines. In another example, a first subroutine may include a comment by a developer that has no effect on the executable. If the comment is amended, the first subroutine may be recompiled, but semantically, comments do not affect operation or execution of code. Therefore, the compiler may determine not to recompile any other subroutines, such as the ten subroutines affected by the value of the previous example (and not affected by the comment).

Figure 6:
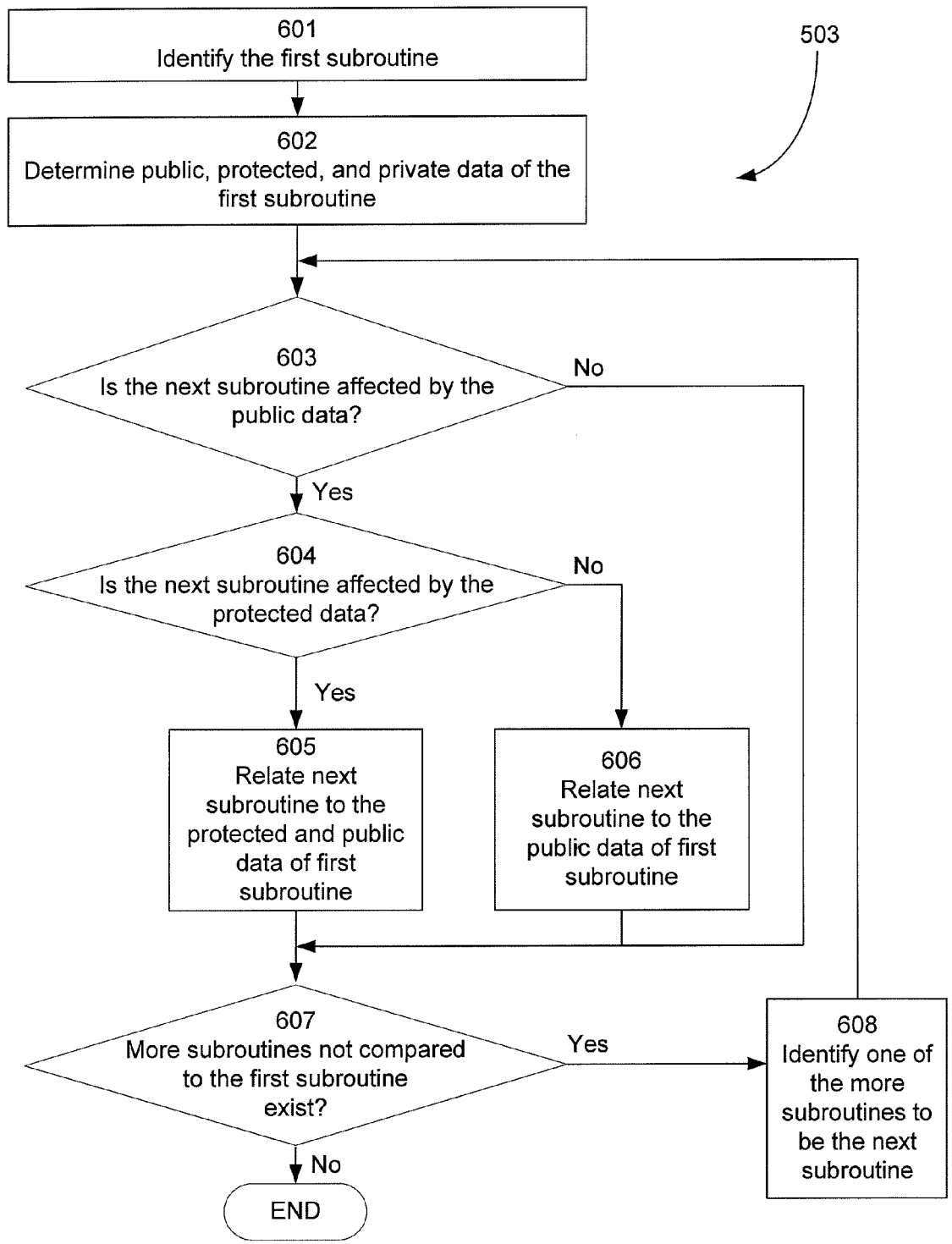
FIG. 6 illustrates an exemplary method for determining the relationships among the subroutines in process 503 of FIG. 5.
Figure 7:
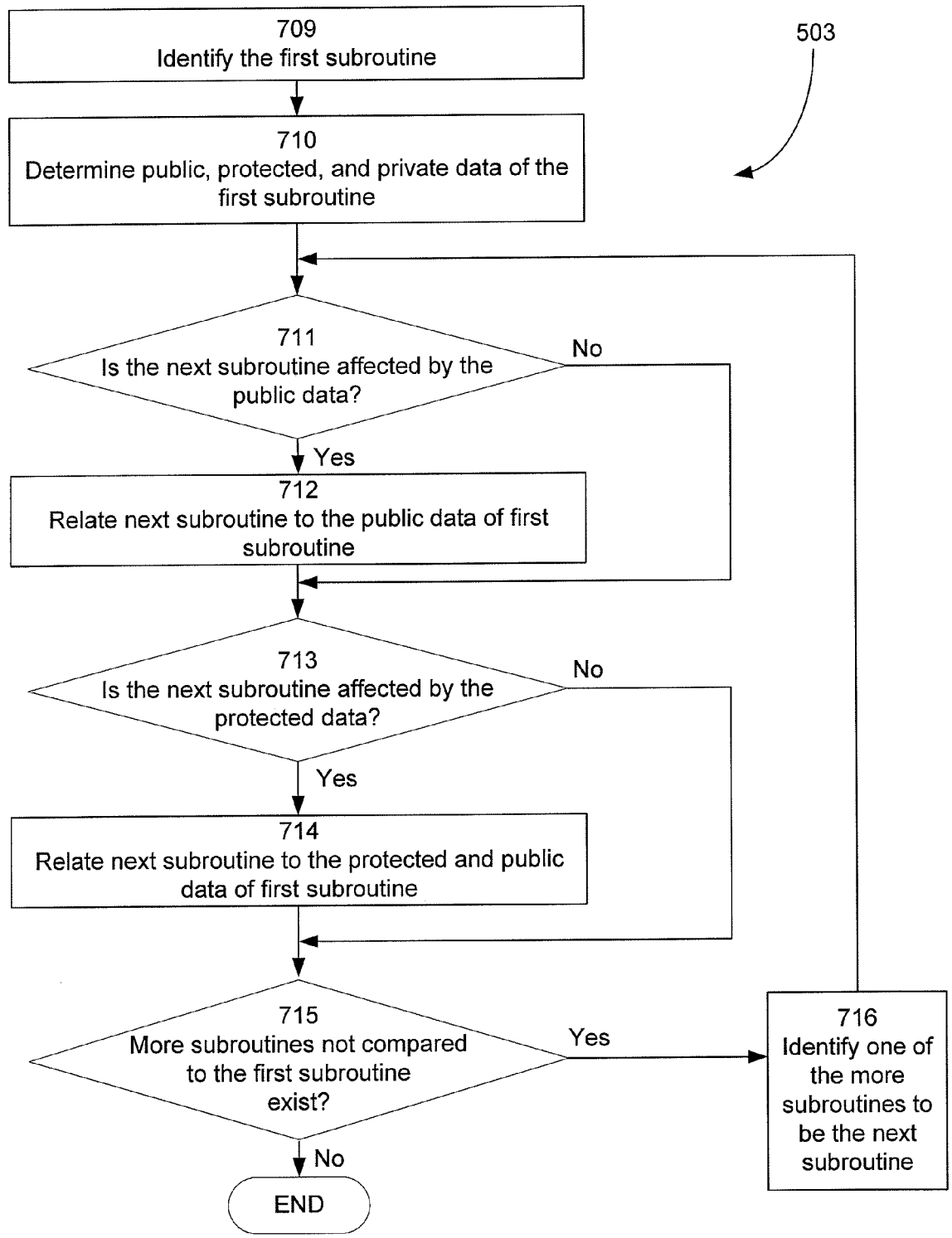
FIG. 7 illustrates an example method for determining the relationships among the subroutines in process 503 of FIG. 5.

FIG. 6 illustrates an example method for relationship determination module 301 to determine subroutine relationships in 503 between a first subroutine and the other subroutines of the source code 202. In one embodiment, method 503 is repeated for each subroutine of the source code 202 so that all relationships of subroutines in the source code are determined.

Beginning at 601, a first subroutine for which other subroutines' relationships to the first subroutine are to be determined is identified. In one embodiment, the next stored file of the source code 202 not previously examined in process 503 is identified. Once the first subroutine is identified, the relationship determination module 301 determines the public data, the protected data, and the private data of the first subroutine in 602. Proceeding to 603, the relationship determination module 301 determines if a next subroutine is affected by the public data. If the next subroutine is not affected by the public data of the first subroutine, then process flows to 607. If the next subroutine is affected by the public data of the first subroutine, then process flows to 604.

In 604, the relationship determination module 301 determines if the next subroutine is also affected by the protected data of the first subroutine. If the next subroutine is affected by the protected data, then the relationship determination module 301 relates the next subroutine to the protected data and the public data of the first subroutine in 605. Therefore, in one embodiment, a modification to the protected data signature or the public data signature of a first subroutine means the next subroutine is to be recompiled. If the next subroutine is not affected by the protected data in 504, then the relationship determination module 301 relates the next subroutine to only the public data of the first subroutine in 606. Therefore, in one embodiment, a modification to the public data signature of a first subroutine means the next subroutine is to be recompiled.

Proceeding to 607, the relationship determination module 301 determines if more subroutines that have not been compared to the first subroutine exist. If more subroutines exist, then the relationship determination module 301 identifies one of them to be the next subroutine in 608 and process reverts to 603. If no more subroutines exist in 607, then the process ends for the first subroutine. As a result of determining if more processes exist, the relationship determination module 301 may ensure that all relationships between the first subroutine and all other subroutines are determined.

As previously described, public, protected, and private data may not be concentric portions of a subroutine (as in FIG. 1). Therefore, FIG. 7 describes another example method for relationship determination module 301 to determine subroutine relationships in 503 between a first subroutine and the other subroutines of the source code 202. In one embodiment, method 503 is repeated for each subroutine of the source code 202 so that all relationships of subroutines in the source code are determined.

Beginning at 709, a first subroutine for which other subroutines' relationships to the first subroutine are to be determined is identified. In one embodiment, the next stored file of the source code 202 not previously examined in process 503 is identified. Once the first subroutine is identified, the relationship determination module 301 determines the public data, the protected data, and the private data of the first subroutine in 710. Proceeding to 711, the relationship determination module 301 determines if a next subroutine is affected by the public data. If the next subroutine is not affected by the public data of the first subroutine, then process flows to 713. If the next subroutine is affected by the public data in 711, then the relationship determination module 301 relates the next subroutine to the public data of the first subroutine in 712. Therefore, in one embodiment, a modification to the public data signature of a first subroutine means the next subroutine is to be recompiled.

Proceeding to 713, the relationship determination module 301 determines if the next subroutine is affected by the protected data of the first subroutine. If the next subroutine is affected by the protected data, then the relationship determination module 301 relates the next subroutine to the protected data of the first subroutine in 714. Therefore, in one embodiment, a modification to the protected data signature of a first subroutine means the next subroutine is to be recompiled. If the next subroutine is not affected by the protected data in 713, then process flows to 715.

Proceeding to 715, the relationship determination module 301 determines if more subroutines that have not been compared to the first subroutine exist. If more subroutines exist, then the relationship determination module 301 identifies one of them to be the next subroutine in 716 and process reverts to 711. If no more subroutines exist in 715, then the process ends for the first subroutine. As a result of determining if more processes exist, the relationship determination module 301 may ensure that all relationships between the first subroutine and all other subroutines are determined. The method of FIG. 7 allows the protected, private, and public data to be mutually exclusive, partially overlapping, or concentric portions of a subroutine. In one embodiment, only subroutines with a relationship to the first subroutine are analyzed. Thus, completely unrelated subroutines are not analyzed by the system during method. In another embodiment, all subroutines may be analyzed.

Figure 8:
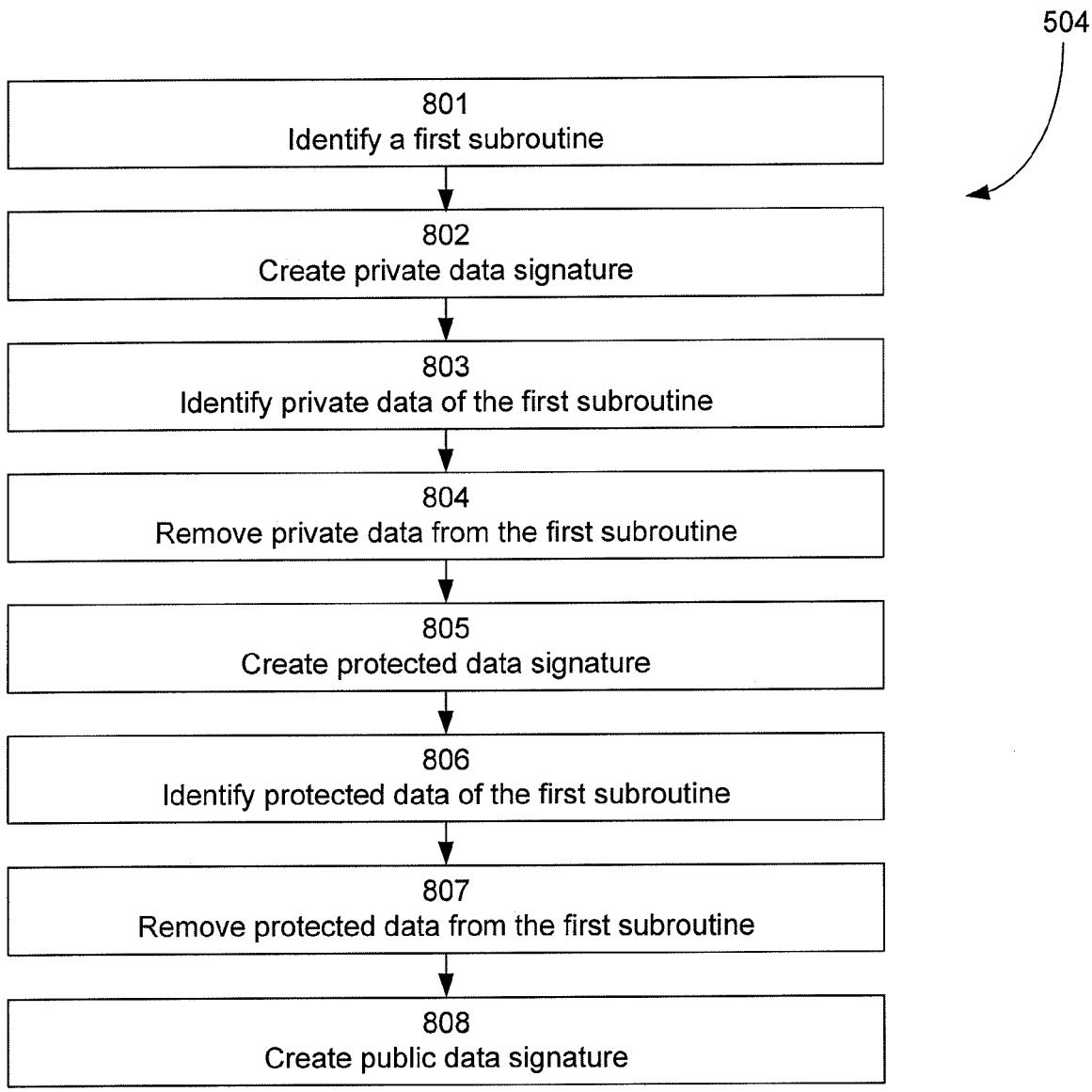
FIG. 8 illustrates an exemplary method for creating signatures of the subroutines in process 504 of FIG. 5.

Referring back to FIG. 5, upon the relationships being determined between the plurality of subroutines in 503, the signature creation module 302 (FIG. 3) creates groups of signatures for the subroutines in 504. FIG. 8 illustrates an example method 504 for creating public, protected, and private data signatures for each subroutine.

Beginning at 801, the signature creation module 302 determines a first subroutine whose public, protected, and private data signatures are to be created. Proceeding to 802, the signature creation module 302 creates a private data signature. To create a private data signature, in one embodiment, the signature creation module 302 includes all of the data (e.g., public, protected, and private data) of the first subroutine into a hash function to create a private hash value.

Upon creating a private data signature, the signature creation module 302 identifies the private data of the first subroutine in 803. In one embodiment, the signature creation module 302 receives the information from the relationship determination module 301 during processes 602 of FIG. 6 and 710 of FIG. 7. Proceeding to 804, the signature creation module 302 removes the private data from the first subroutine.

Hence, the signature creation module 302 creates a protected data signature in 805 (including all of the data of the first subroutine minus the private data). In one embodiment, the first subroutine minus the private data (i.e., the public data and protected data of the subroutine) is placed into a hash function to create a protected hash value. Upon creating a protected data signature in 805, the signature creation module 302 identifies the protected data of the first subroutine in 806. In one embodiment, the signature creation module 302 receives the information from the relationship determination module 301 during processes 602 of FIG. 6 and 710 of FIG. 7. Proceeding to 807, the signature creation module 302 removes the protected data from the first subroutine (i.e., leaving the public data). Upon removing the protected data, the signature creation module 301 creates a public data signature from the first subroutine in 808. In one embodiment, to create a public data signature, the signature creation module 302 excludes the private data and the protected data, thus including the public data of the first subroutine into the hash function to create a public hash value. The method of FIG. 8 may then be repeated for the other subroutines of the source code in order to generate a private data signature, a protected data signature, and a public data signature for each subroutine of the source code.

If the private, protected, and public data are not concentric, then instead of stripping data to create a data signature, the system may look at exclusively the data of a subroutine for which a signature is to be created. Hence, in one example, a private data signature may be a hash of the private data of the first subroutine.

Referring back to FIG. 5, upon creating the groups of private, protected, and public data signatures, process flows to 505. In 505, the signature/subroutine index module 303 (FIG. 3) maps the groups of signatures according to the relationships between the subroutines determined in 503. In one embodiment, the index module 303 maps the public data signatures to create a first index, the protected data signatures to create a second index, and the private data signatures to create a third index. The indexes may be organized in hierarchical form (tree-branch structure) or canonical form to include the relationships between the subroutines of the signatures.

Figure 9:
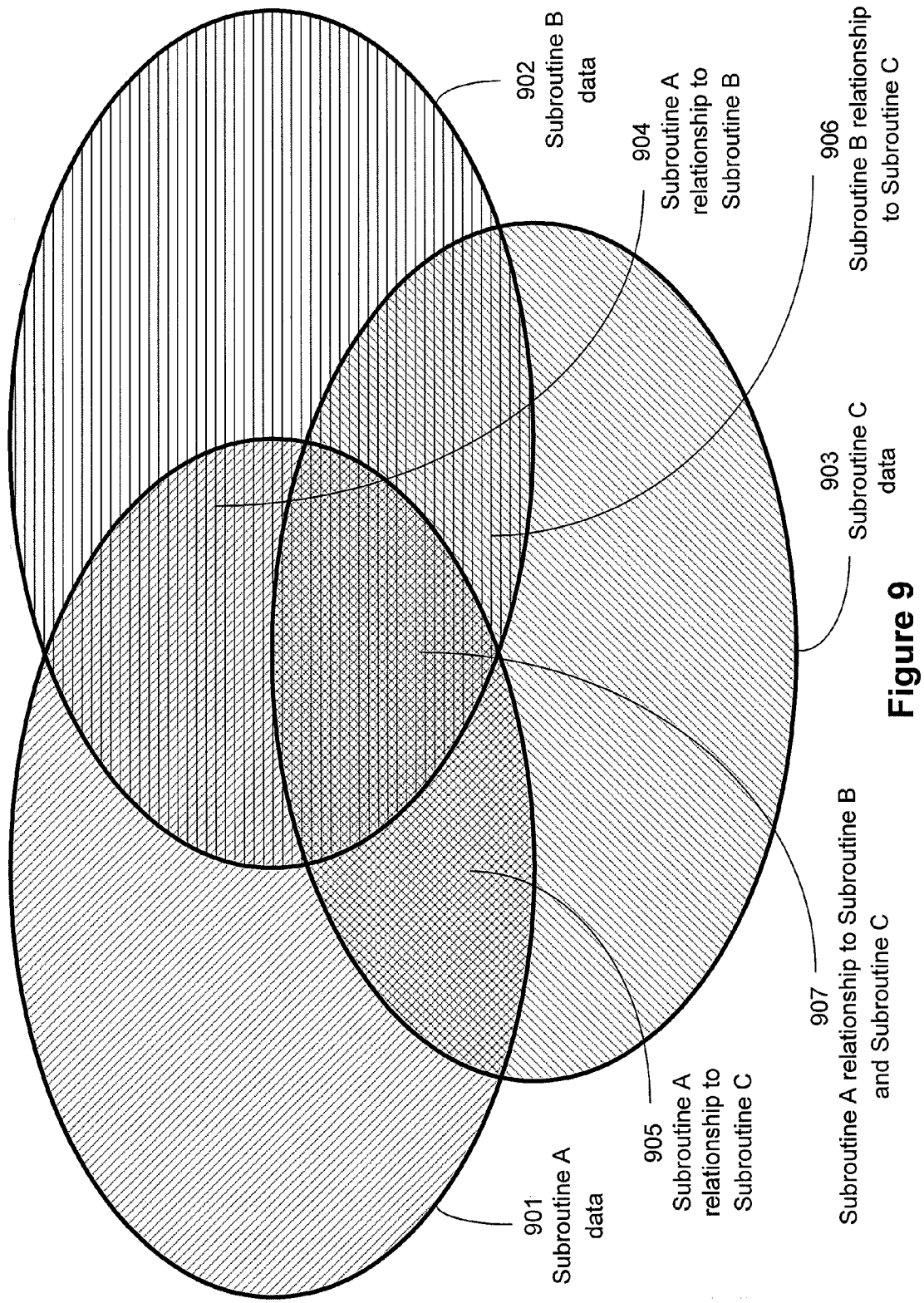
FIG. 9 illustrates an example Venn Diagram of data of three subroutines for which relationships are to be determined in process 504 of FIG. 5.

FIG. 9 is a Venn diagram to illustrate an example of relationships between subroutine A 901, subroutine B 902, and subroutine C 903. Data of subroutine A 901 that affects subroutine B 902 is in 904. Therefore, subroutine B 902 is related to subroutine A. Subroutine relationships are also determined from sections 905 (subroutine C 903 relation to subroutine A 901) and 906 (subroutine C 903 relation to subroutine B 902). Section 907 is an intersection of all three subroutines, including data from subroutine A, B, or C by which the other two subroutines are affected. The data in each section may be public or protected, while private data is part of the outermost sections outside of any intersections. If any section is a null-set, then the two subroutines are not related. For example, if 905 is empty, subroutine A 901 is not related to subroutine C 903.

If a subroutine is affected by another section's protected (or public) data, then the section intersecting the two subroutines includes the protected (or public) data. If not, the section does not include the protected data. For example, if subroutine B 902 is affected by the protected data of subroutine C 903, then the protected data of subroutine C is in section 906. Hence, the mapping of signatures includes relationship information of the intersections of the types of data of the subroutines according to the effects on other subroutines.

Referring back to FIG. 3, in one embodiment, the signature/subroutine index module 303 may also create a signature to subroutine index to allow lookup of a signature and determine to which subroutine it corresponds. Upon mapping the signatures into indexes (and possibly creating a signature/subroutine index) in 505 (FIG. 5), the signature/subroutine index module 303 stores the signatures and signature mappings in the signature relationship storage 304 and/or in the module 303. In one embodiment, the multiple signature mappings and signatures (e.g., private data signatures 305, protected data signatures 306, and public data signatures 307) are stored in storage 304 and the signature/subroutine index is stored in the module 303.

Update of Signatures when Subroutine is Modified

Figure 10:
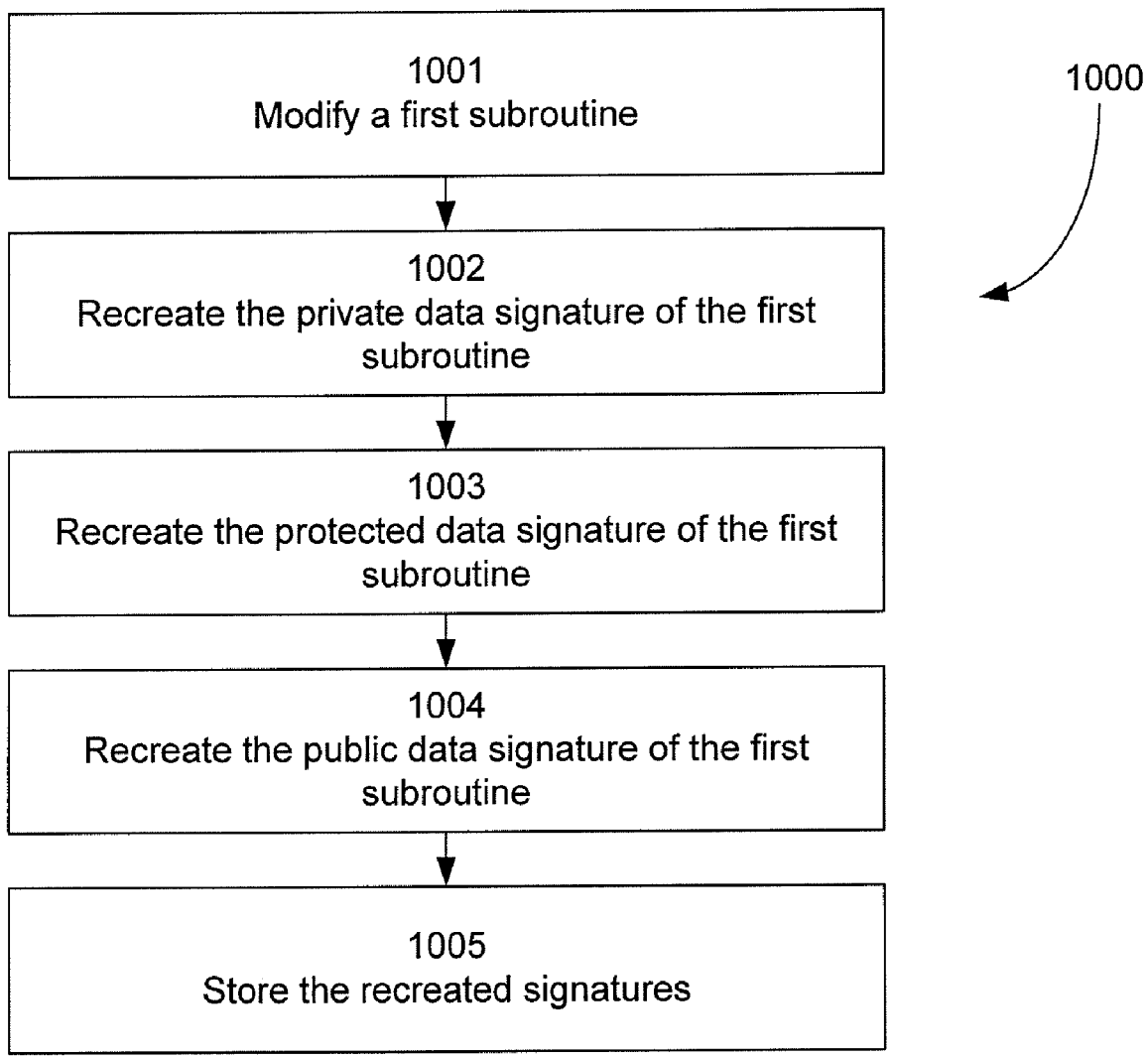
FIG. 10 illustrates an exemplary method for recreating the signatures of a subroutine after modification of the subroutine.

Having all of the signatures and signature mappings stored, the signature creation module 302 may update signatures for a first subroutine whenever the first subroutine is modified. FIG. 10 illustrates an exemplary method for creating new signatures of a modified first subroutine. Beginning at 1001, a first subroutine is modified (e.g., by the developer(s)). Proceeding to 1002, the signature creation module 302 creates a new private data signature of the first subroutine.

To create any signature, module 302 may need to recognize that a subroutine has been modified. To determine a subroutine may have been modified, the signature creation module 302 may compare time stamps of the subroutines to the first subroutine in order to determine that the first subroutine has been updated more recently than the other subroutines. In another embodiment, the signature creation module 302 may automatically receive subroutines when modified so as to know that the subroutine has been modified.

Proceeding to 1003, the signature creation module 302 creates a new protected data signature of the first subroutine. The signature creation module 302 also creates a new public data signature of the first subroutine in 1004. Upon creating the private data, protected data, and public data signatures, the signature creation module 302 passes the signatures to the signature/subroutine index module 303 in order for the module to store the signatures in storage 304. In one embodiment, each signature is stored as a new version of a previous signature. Therefore, both signatures are stored for later comparison. In another embodiment, each signature may have a flag associated with it. Therefore, a new signature is compared to the old signature during storage where the old signature is overwritten. If the signatures are not equal, then the flag is set. If the signatures are equal, then the flag is not changed.

Determination of Subroutines to be Recompiled and Recompilation

Since the signature creation module 302 may determine new signatures, in one embodiment, the signature/subroutine index module 303 may determine which subroutines are to be recompiled through the signature indexes in storage 304 and the signature/subroutine index in module 303. Thus, module 303 may send a list of subroutines to be recompiled to storage 201 in order for the identified subroutines to be sent to compiler 204. In another embodiment for identifying subroutines, the subroutine selector 400 determines from the signature mappings (including the subroutine relationships) and the old and new signatures created by the signature creation module 302 which subroutines are to be recompiled after modification of a first subroutine.

Figure 11:
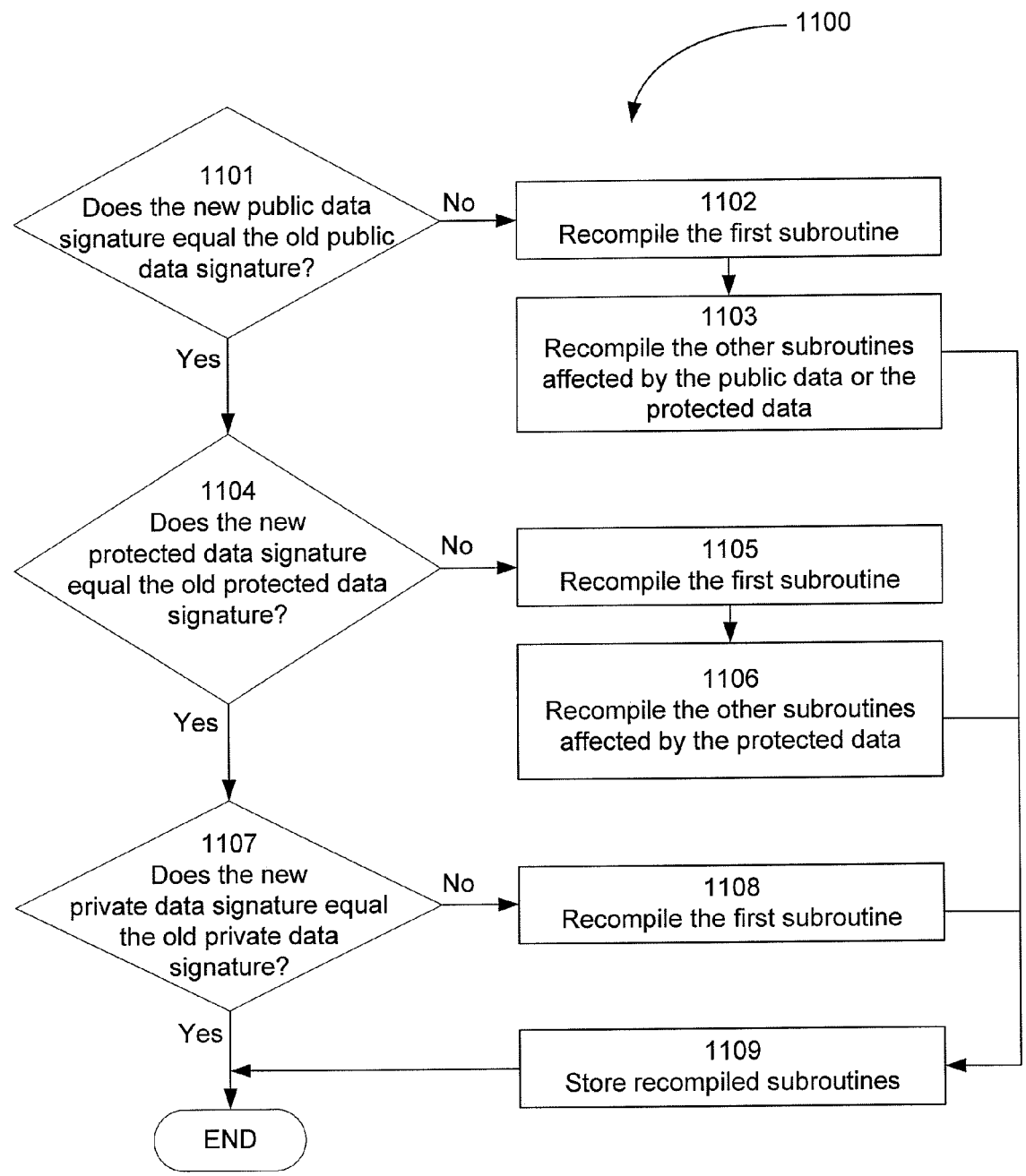
FIG. 11 illustrates an exemplary method for determining by the system of FIG. 2 which subroutines are to be recompiled.

FIG. 11 illustrates an example method 1100 for the subroutine selector 400 or the signature/subroutine index module 303 to determine which subroutines are to be recompiled, the compiler 204 to recompile the identified subroutines, and the storage 201 to store the recompiled subroutines in 203. Beginning at 1101, the system compares a new public data signature to an old public data signature stored in storage 304 for a first subroutine identified as modified. If the old public data signature does not equal the new public data signature, then the first subroutine is recompiled in 1102 and any subroutines affected by the public or protected data of the first subroutine are recompiled in 1103. As previously stated, in one embodiment to determine related subroutines, related data signatures are read from the hierarchy of signatures in a data signature index (e.g., public data signature index). The subroutines of the related signatures are then determined by looking up the signatures in the signature/subroutine index.

Referring back to 1101, if the new public data signature equals the old public data signature, then process flows to 1104. In 1104, the system compares the new protected data signature to the old protected data signature. If the new protected data signature does not equal the old protected data signature, then the first subroutine is recompiled in 1105 and the other subroutines affected by the protected data of the first subroutine are recompiled in 1106. If the new protected data signature equals the old protected data signature in 1104, then process flows to 1107. In 1107, the system compares the new private data signature to the old private data signature. If the new private data signature does not equal the old private data signature, then the first subroutine is recompiled in 1108. If the new private data signature equals the old private data signature, then process ends without any subroutines being recompiled by the system. Upon recompiling all affected subroutines, the system stores the recompiled subroutines in storage 201 in 1109. As a result, the system recompiles all subroutines determined to be affected by modified data but does not touch subroutines not affected by the modified data.

In another embodiment alternative to FIG. 11, if the public, protected, and private data of a subroutine are not concentric, then the system may compare each pair of new and old data signatures to determine if a change in the public data, protected data, and private data exist. For example, if a change in public data exists, then subroutines related to the public data are recompiled. If a change in protected data exists, then subroutines related to the protected data are recompiled. If a change in private data exists, then subroutines related to the private data are recompiled. With the public, protected, and private data not being necessarily concentric, then the three groups of related subroutines may partially overlap, be mutually exclusive, and/or completely overlap (such as when the data of the first subroutine is concentric).

Exemplary Computer Architecture for Implementation of Systems and Methods

Figure 12:
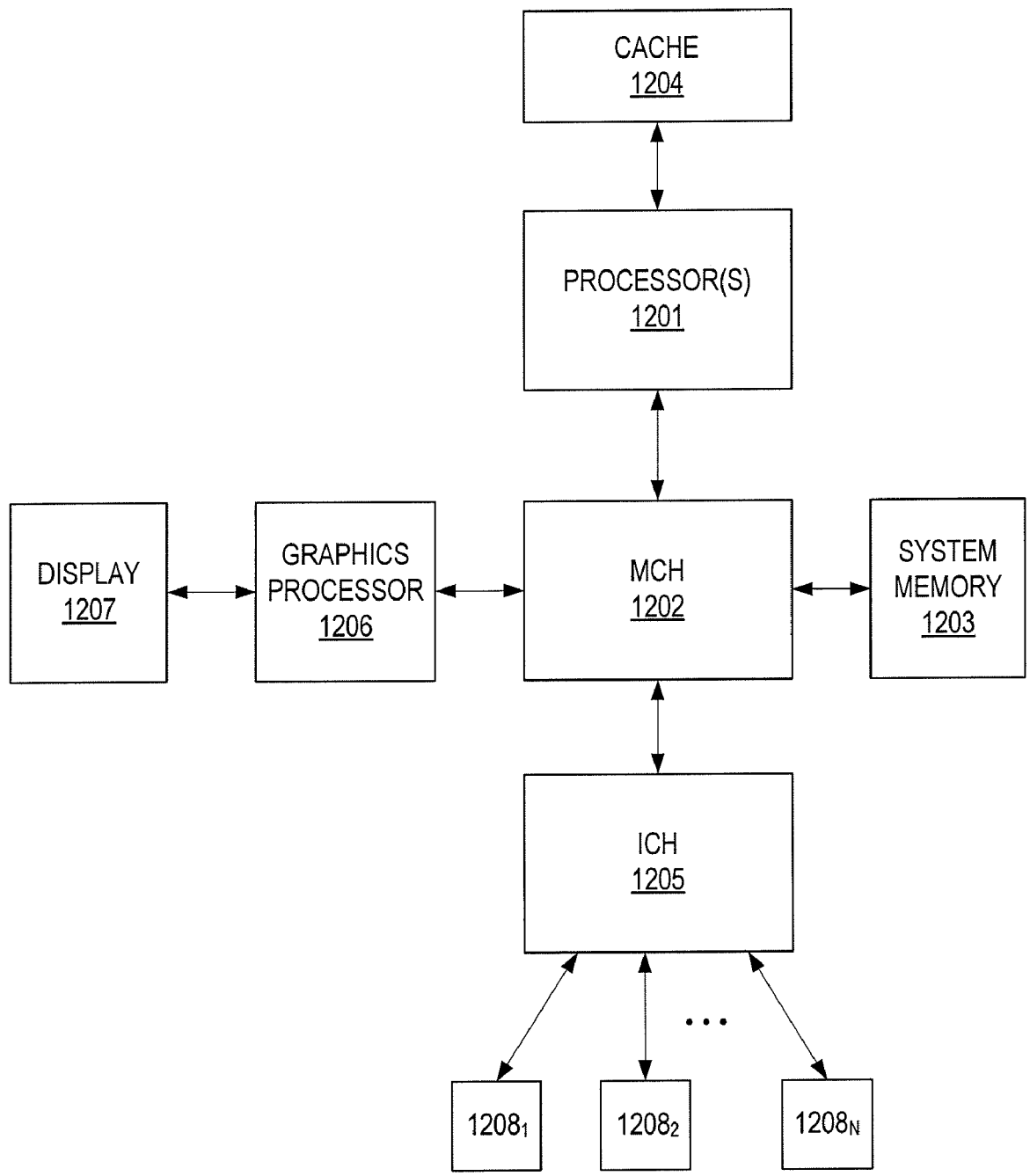
FIG. 12 illustrates an exemplary computer architecture for implementation of the example system of FIGS. 2-4 and execution of the example methods of FIGS. 5-8 and 10-11.

The above methods have been described in terms of the system 200 in FIGS. 2-4. FIG. 12 illustrates an example computer architecture for implementing the described systems and methods. The exemplary computing system of FIG. 12 includes: 1) one or more processors 1201; 2) a memory control hub (MCH) 1202; 3) a system memory 1203 (of which different types exist such as DDR RAM, EDO RAM, etc,); 4) a cache 1204; 5) an I/O control hub (ICH) 1205; 6) a graphics processor 1206; 7) a display/screen 1207 (of which different types exist such as Cathode Ray Tube (CRT), Thin Film Transistor (TFT), Liquid Crystal Display (LCD), DPL, etc.); and/or 8) one or more I/O devices 1208.

The one or more processors 1201 execute instructions in order to perform whatever software routines the computing system implements. The instructions frequently involve some sort of operation performed upon data. Both data and instructions are stored in system memory 1203 and cache 1204. Cache 1204 is typically designed to have shorter latency times than system memory 1203. For example, cache 1204 might be integrated onto the same silicon chip(s) as the processor(s) and/or constructed with faster SRAM cells whilst system memory 1203 might be constructed with slower DRAM cells. By tending to store more frequently used instructions and data in the cache 1204 as opposed to the system memory 1203, the overall performance efficiency of the computing system improves.

System memory 1203 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1203 prior to their being operated upon by the one or more processor(s) 1201 in the implementation of a software program. Similarly, data that a software program determines should be sent from the computing system to an outside entity through one of the computing system interfaces, or stored into an internal storage element, is often temporarily queued in system memory 1203 prior to its being transmitted or stored.

The ICH 1205 is responsible for ensuring that such data is properly passed between the system memory 1203 and its appropriate corresponding computing system interface (and internal storage device if the computing system is so designed). The MCH 1202 is responsible for managing the various contending requests for system memory 1203 access amongst the processor(s) 1201, interfaces and internal storage elements that may proximately arise in time with respect to one another.

One or more I/O devices 1208 are also implemented in a typical computing system. I/O devices generally are responsible for transferring data to and/or from the computing system (e.g., a networking adapter); or, for large scale non-volatile storage within the computing system (e.g., hard disk drive). ICH 1205 has bi-directional point to-point links between itself and the observed I/O devices 1208.

Referring back to FIGS. 2-4, modules of the different embodiments of the described system may include software, hardware, firmware, or any combination thereof. The modules may be software programs available to the public or special or general purpose processors running proprietary or public software. The software may also be specialized programs written specifically for signature creation and organization and recompilation management. For example, storage of the system may include, but is not limited to, hardware (such as floppy diskettes, optical disks, CD-ROMs, and magneto-optical disks, ROMs, RAMs, EPROMs, EEPROMs, flash, magnetic or optical cards, propagation media or other type of media/machine-readable medium), software (such as instructions to require storage of information on a hardware storage unit, or any combination thereof.

In addition, elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, flash, magnetic or optical cards, propagation media or other type of media/machine-readable medium suitable for storing electronic instructions.

For the exemplary methods illustrated in FIGS. 5-8 and 10-11, embodiments of the invention may include the various processes as set forth above. The processes may be embodied in machine-executable instructions which cause a general-purpose or special-purpose processor to perform certain steps. Alternatively, these processes may be performed by specific hardware components that contain hardwired logic for performing the processes, or by any combination of programmed computer components and custom hardware components.

Embodiments of the invention do not require all of the various processes presented, and it may be conceived by one skilled in the art as to how to practice the embodiments of the invention without specific processes presented or with extra processes not presented. For example, while it has been described to separate a subroutine into public, protected, and private data and create signatures from those types of data, one skilled in the art would recognize that a subroutine may be separated into types of data with multiple levels of granularity. In another example, while source code has been described in a generic sense, source code may be of any programming language, including, but not limited to, COBAL, FORTRAN, BASIC, C, C++, ECMA, XML, Flash, ActionScript 3, or other object oriented programming languages.

In another example, while determining dependencies for subroutines has been described as done for a first compilation, dependencies/relationships may be determined at recompile. Therefore, the system may conserve resources by not determining all relationships between the subroutines, but determining relationships to any data that is modified and thus is to be recompiled. For example, when a first subroutine is modified, the dependencies of other subroutines to the first subroutine may then be determined. Therefore, in one embodiment, the system does not determine the public, protected, and private portions of a subroutine during a first compile. The different portions of data may be determined later when a subroutine is recompiled and dependencies between the modified data and the other subroutines are to be determined. In another embodiment, the public, protected, and private data may be determined on a first compile, but the relationships may be determined at a later point (e.g., during recompilation). As a result, organization of signatures may be created after modification to the data in an alternative to storing indexes and/or mappings of signatures.

General

The foregoing description of the embodiments of the invention has been presented only for the purpose of illustration and description and is not intended to be exhaustive or to limit the invention to the precise forms disclosed. Numerous modifications and adaptations are apparent to those skilled in the art without departing from the spirit and scope of the invention.

What is claimed is:

1. A computer implemented method, comprising:
    separating a file comprising source code into a plurality of subroutines and a plurality of data elements;
    determining a relationship between a first subroutine, a second subroutine of the plurality of subroutines, and at least one of the plurality of data elements;
    creating a first signature of the first subroutine and a second signature of the second subroutine, the first and second signatures based on the at least one of the plurality of data elements;
    storing the first signature and the second signature in a data structure, the data structure configured to indicate the relationship between the first subroutine, the second subroutine, and the at least one data element;
    comparing the first signature to a new first signature based on a modification of the first subroutine; and
    determining whether the relationship between the modified first subroutine and the second subroutine has changed and, if the relationship has changed, updating the data structure with the new first signature based on the changed relationship; and
    determining whether to recompile the second subroutine based on the data structure and the new first signature.

2. The computer implemented method of claim 1, wherein:
    the first subroutine comprises a first data not affecting the second subroutine and other subroutines of the plurality of subroutines, wherein the first signature represents the first data not affecting other subroutines; and
    the second subroutine comprises a second data not affecting the first subroutine and other subroutines of the plurality of subroutines, wherein the second signature represents the second data not affecting other subroutines.

3. The computer implemented method of claim 2, further comprising:
    creating a third signature of the first subroutine, wherein the third signature does not represent the first data;
    creating a fourth signature of the second subroutine, wherein the fourth signature does not represent the second data; and
    storing the third signature and the fourth signature so as to preserve the relationship between the first subroutine and the second subroutine.

4. The computer implemented method of claim 3, further comprising:
    compiling the file to create a compiled file, comprising compiling the first subroutine to create a first compiled code and compiling the second subroutine to create a second compiled code; and
    storing the compiled file, comprising storing the first byte code and storing the second byte code for independent access by the computer.

5. The computer implemented method of claim 1, further comprising:
    recompiling the first subroutine to create a new first byte code if the first signature is not equal to the new first signature;
    responsive to determining to not recompile the second subroutine, not recompiling the second subroutine, and storing the new first byte code to replace the stored first byte code.

6. The computer implemented method of claim 4, further comprising:
    creating a new third signature if the first subroutine is modified;
    comparing the third signature to the new third signature;
    recompiling the second subroutine to create a new second byte code if the third signature is not equal to the new third signature; and
    storing the new second byte code to replace the stored second byte code.

7. The computer implemented method of claim 2, wherein:
    the first data is a first comment in the first subroutine;
    the second data is a second comment in the second subroutine; and
    creating a signature comprises hashing the corresponding subroutine.

8. The computer implemented method of claim 1, further comprising:
    determining relationships among each of the plurality of subroutines;
    creating for each subroutine in the plurality of subroutines a signature of the subroutine; and
    storing the plurality of signatures so as to preserve the relationships among the plurality of subroutines.

9. The computer implemented method of claim 1, wherein the source code is ActionScript.

10. A non-transitory computer-readable medium on which is encoded program code, the program code to organize a source code, comprising:
    program code to separate a file comprising source code into a plurality of subroutines and a plurality of data elements;
    program code to determine a relationship between a first subroutine and a second subroutine of the plurality of subroutines, and at least one of the plurality of data elements;
    program code to create a first signature of the first subroutine and to create a second signature of the second subroutine, the first and second signatures based on the at least one of the plurality of data elements;
    program code to store the first signature and the second signature in a data structure, the data structure configured to indicate the relationship between the first subroutine, the second subroutine, and the at least one data element;
    program code to compare the first signature to a new first signature based on a modification of the first subroutine; and
    program code to determine whether the relationship between the modified first subroutine and the second subroutine has changed and, if the relationship has changed, updating the data structure with the new first signature based on the changed relationship; and program code to determine whether to recompile the second subroutine based on the data structure and the new first signature.

11. The non-transitory computer-readable medium of claim 10, wherein:
the first subroutine comprises a first data not affecting the second subroutine and other subroutines of the plurality of subroutines, wherein the first signature represents the first data not affecting other subroutines; and
the second subroutine comprises a second data not affecting the first subroutine and other subroutines of the plurality of subroutines, wherein the second signature represents the second data not affecting other subroutines.

12. The non-transitory computer-readable medium of claim 11, further comprising:
program code to create a third signature of the first subroutine, wherein the third signature does not represent the first data;
program code to create a fourth signature of the second subroutine, wherein the fourth signature does not represent the second data; and
program code to store the third signature and the fourth signature so as to preserve the relationship between the first subroutine and the second subroutine.

13. The non-transitory computer-readable medium of claim 12, further comprising:
program code to compile the file to create a compiled file, comprising compiling the first subroutine to create a first compiled code and compiling the second subroutine to create a second compiled code; and
program code to store the compiled file, comprising storing the first byte code and storing the second byte code for independent access by the computer.

14. The non-transitory computer-readable medium of claim 10, further comprising:
program code to recompile the first subroutine to create a new first byte code if the first signature is not equal to the new first signature;
program code to, responsive to determining to not recompile the second subroutine, not recompiling the second subroutine, and
program code to store the new first byte code to replace the stored first byte code.

15. The non-transitory computer-readable medium of claim 13, further comprising:
program code to create a new third signature if the first subroutine is modified;
program code to compare the third signature to the new third signature;
program code to recompile the second subroutine to create a new second byte code if the third signature is not equal to the new third signature; and
program code to store the new second byte code to replace the stored second byte code.

16. The non-transitory computer-readable medium of claim 11, wherein:
the first data is a first comment in the first subroutine;
the second data is a second comment in the second subroutine; and
creating a signature comprises hashing the corresponding subroutine.

17. The non-transitory computer-readable medium of claim 11, further comprising:
program code to determine relationships among each of the plurality of subroutines;

program code to create for each subroutine in the plurality of subroutines a signature of the subroutine; and
program code to store the plurality of signatures so as to preserve the relationships among the plurality of subroutines.

18. The non-transitory computer-readable medium of claim 10, wherein the source code is ActionScript.

19. A system, comprising:
a non-transitory computer-readable medium; and
a processor in communication with the non-transitory computer-readable medium, wherein the processor is configured to execute program code stored in the non-transitory computer-readable medium, the program code comprising:
program code to separate a file comprising source code into a plurality of subroutines and a plurality of data elements;
program code to determine a relationship between a first subroutine and a second subroutine of the plurality of subroutines, and at least one of the plurality of data elements;
program code to create a first signature of the first subroutine and to create a second signature of the second subroutine, the first and second signatures based on the at least one of the plurality of data elements;
program code to store the first signature and the second signature in a data structure, the data structure configured to indicate the relationship between the first subroutine, the second subroutine, and the at least one data element;
program code to compare the first signature to a new first signature based on a modification of the first subroutine; and
program code to determine whether the relationship between the modified first subroutine and the second subroutine has changed and, if the relationship has changed, updating the data structure with the new first signature based on the changed relationship; and
program code to determine whether to recompile the second subroutine based on the data structure and the new first signature.

20. The system of claim 19, wherein the plurality of subroutines are determined to be related to a subroutine of the plurality of subroutines whose data is modified and a new signature created.

21. The computer implemented method of claim 1, wherein the data structure comprises a tree structure.

22. The non-transitory computer-readable medium of claim 10, wherein the data structure comprises a tree structure.

23. The system of claim 19, wherein the data structure comprises a tree structure.

24. The computer implemented method of claim 1, wherein separating the plurality of subroutines and the plurality of data elements comprises:
identifying a first subset of the plurality of subroutines having a first common characteristic, wherein the first subroutine is a member of the first subset;
identifying a second subset of the plurality of subroutines have a second common characteristic, wherein the first subroutine is a member of the first subset; and
wherein the at least one data element is associated with one of the first common characteristic or the second common characteristic, and
wherein the relationship is based on the first and second common characteristics.

25. The computer implemented method of claim 24, wherein the first common characteristic is a private access type and the second common characteristic is a public access type.

26. The computer implemented method of claim 1, wherein the first signature is a public signature of the first subroutine, and further comprising creating a private signature of the first subroutine and storing the private signature of the first subroutine in the data structure based on the relationship of the first subroutine and the second subroutine to; wherein:

the public signature is based on one or more public data elements accessed by the first subroutine, and the private signature is based on one or more private data elements accessed by the first subroutine, and the public signature is not based on the one or more private data elements, and the private signature is not based on the one or more public data elements.

27. The computer implemented method of claim 26, further comprising creating a protected signature of the first subroutine and storing the protected signature in the data structure based on the relationship of the first subroutine and the second subroutine, wherein the protected signature is based on one or more protected data elements and is not based on the one or more public data elements or the one or more private data elements, and the public and private signatures are further not based on the one or more protected data elements.

* * * * *